May 9, 1967 H. T. CLARK 3,318,472
TRAILER
Filed April 28, 1965 3 Sheets-Sheet 1
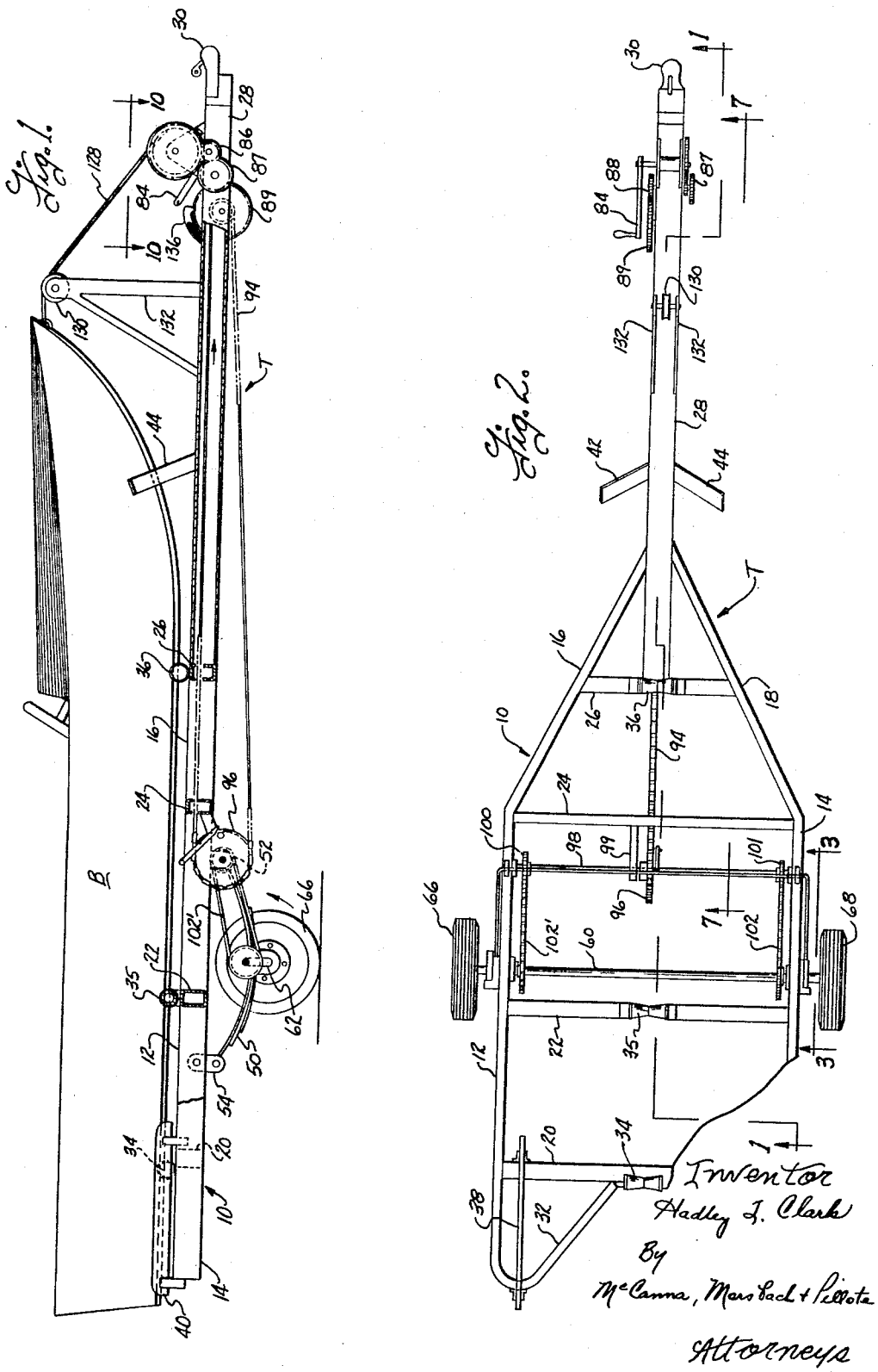

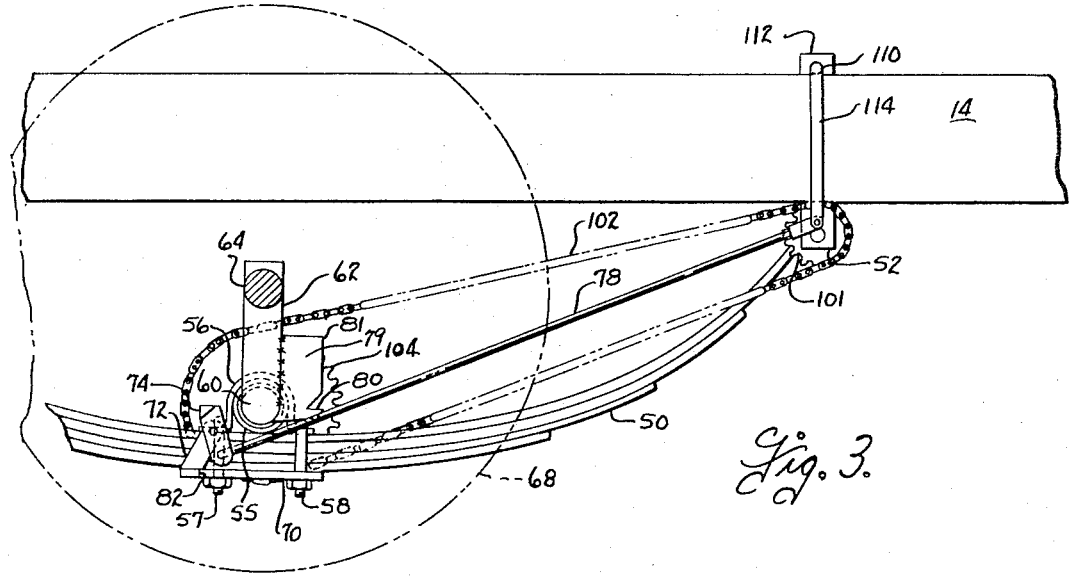
Fig. 3.
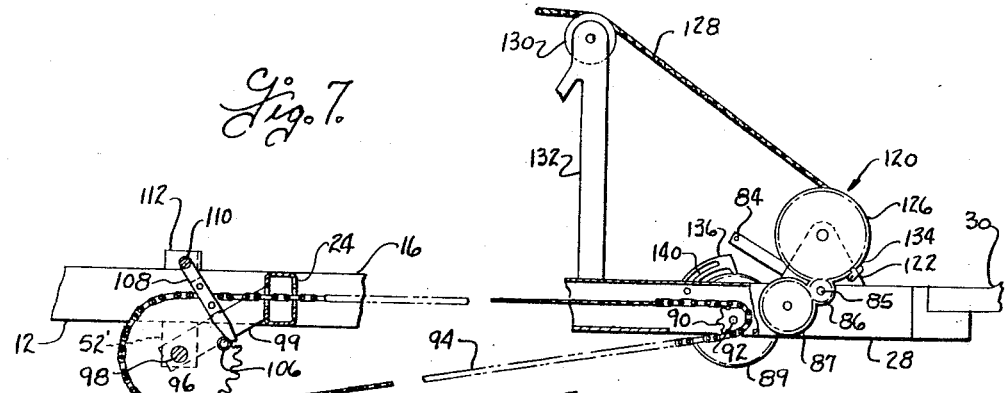
Fig. 7.
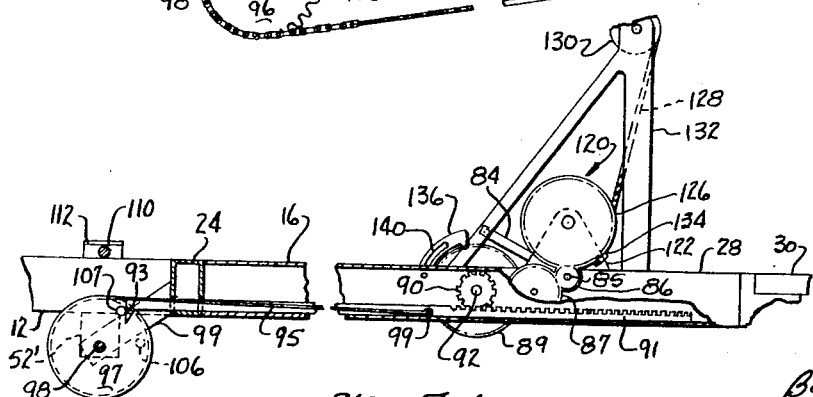
Fig. 7-A.
Inventor
Hadley T. Clark
By
McCanna, Morsbach & Pillote
Attorneys

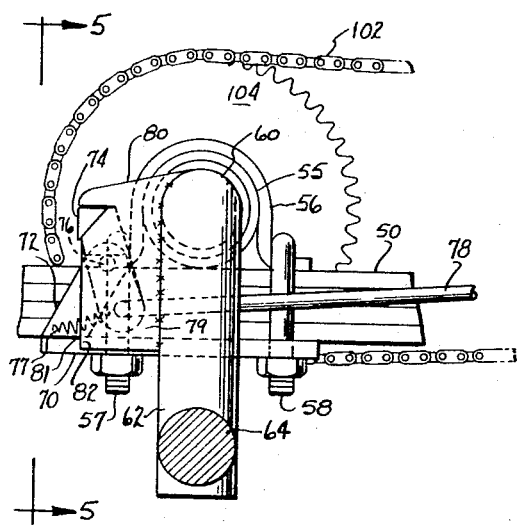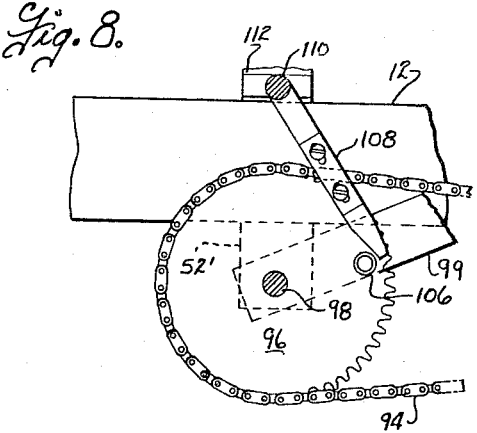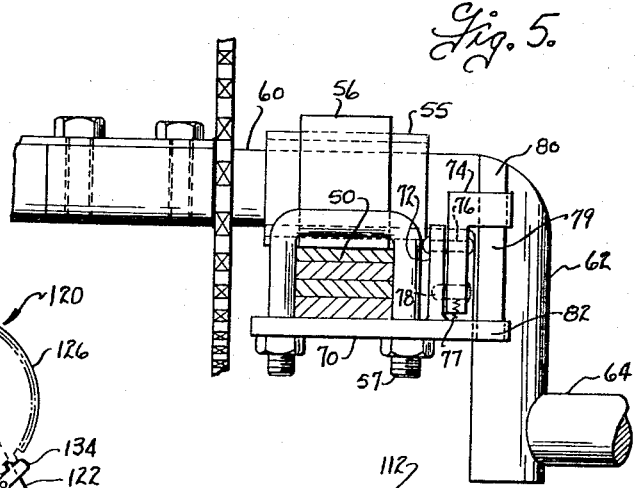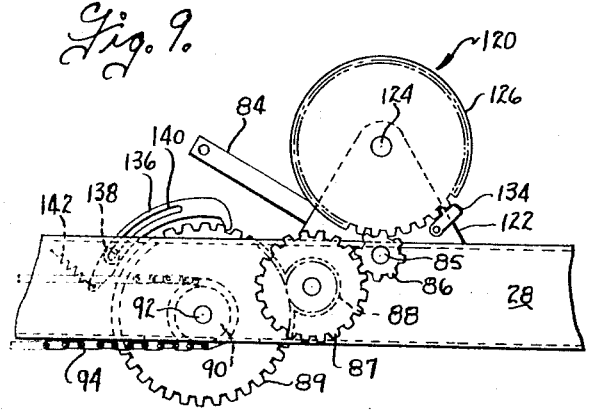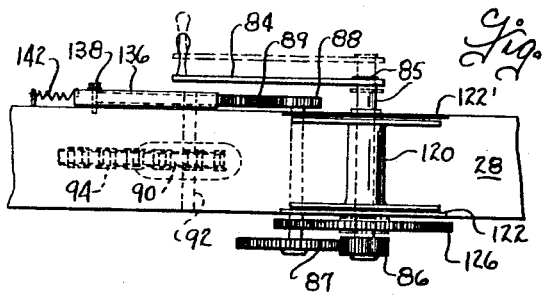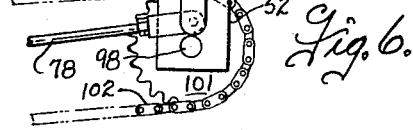

United States Patent Office 3,318,472
Patented May 9, 1967

3,318,472
TRAILER
Hadley T. Clark, 1213 17th Ave., Rockford, Ill. 61108;
Gladys J. Clark, executor of said Hadley T. Clark, deceased
Filed Apr. 28, 1965, Ser. No. 451,561
17 Claims. (Cl. 214—506)

This invention relates generally to trailers and more particularly to a trailer of the drop frame type which may be lowered and raised for receiving and transporting a load as, for example, a boat.

The principal object of this invention is to provide a trailer having a frame that can be raised and lowered very quickly and with a minimum of effort.

Another object of this invention is to provide a trailer in accordance with the foregoing objects and which includes actuating means for raising and lowering the frame, the actuating means being so constructed and arranged that a minimum amount of exertion on the part of the operator is required in lifting the trailer frame and a load thereon.

Still another object of the invention is to provide a trailer of the drop frame type in accordance with the foregoing object and including a lock means for locking the trailer in raised position.

Yet another object of this invention is to provide a trailer in accordance with the foregoing objects and including a lock disengaging means operatively connected to the actuating means for disengaging the lock means at the start of movement to lower the frame.

A further object of this invention is to provide a trailer of the drop frame type having actuating means for raising and lowering the frame and winch means adjacent the front of the frame for drawing a load onto the trailer, together with a common operating means for selectively and alternatively operating the actuating means and the winch means.

Yet another object of the invention is to provide a trailer of the drop frame type having a spring suspension for the trailer wheels to absorb road shocks during transport and in which the means for raising and lowering the frame is so arranged as to not interfere with the spring action of the wheel suspension.

These and other objects and advantages of the invention will be more readily understood by reference to the following detailed description and the accompanying drawings wherein:

FIG. 1 is a longitudinal view, in part sectional and in part elevational, along broken line 1—1 of FIG. 2 and showing an embodiment of the present invention with its frame in a raised or transport position and with a boat resting thereon;

FIG. 2 is a top view of a trailer constructed in accordance with the present invention;

FIG. 3 is a fragmentary sectional view taken along line 3—3 of FIG. 2 and on a larger scale showing the axle mounting and lock mechanism therefor in lowered or loading position and a portion of the actuating means for raising and lowering the frame;

FIG. 4 is an enlarged fragmentary view of the axle mounting and lock mechanism of FIG. 3 and showing the relationship of the parts in raised or transport position;

FIG. 5 is a fragmentary sectional view taken along line 5—5 of FIG. 4 and showing another view of the parts illustrated in FIG. 4;

FIG. 6 is an enlarged fragmentary view of a portion of the actuating means illustrated in FIG. 3;

FIG. 7 is a fragmentary sectional view taken along line 7—7 of FIG. 2 and on a larger scale showing another portion of the actuating means for raising and lowering the frame and a winch adjacent the front of the trailer and with a portion broken away to better illustrate the relationship of the parts;

FIG. 7-A is a fragmentary sectional view similar to FIG. 7 and showing a preferred embodiment of the portion of the actuating means illustrated in FIG. 7;

FIG. 8 is an enlarged fragmentary sectional view of a portion of the actuating means illustrated in FIG. 7;

FIG. 9 is a fragmentary elevational view on an enlarged scale with respect to FIG. 7 and showing the portion of the actuating mechanism adjacent the front of the trailer and a winch mounted adjacent thereto; and FIG. 10 is a fragmentary top view taken generally along line 10—10 of FIG. 1 and on a larger scale showing a top view of the parts shown in FIG. 9 and also illustrating a move position for the crank for selectively engaging the winch or a gear of the actuating means.

Referring now more particularly to the drawings, the trailer, generally identified at T, includes a frame generally designated by the numeral 11 which may be formed of any suitable material, such as steel. It is contemplated that the frame may be shaped in any manner convenient to effectuate the purpose of the trailer, however, it is herein illustrated as having spaced parallel side rails 12 and 14 respectively joined, as by welding, to converging members 16 and 18. Transverse members 20, 22 and 24 are joined, as by welding, to side rails 12 and 14 and transverse member 26 is likewise joined to converging members 16 and 18. The aforementioned members of the frame 11 may be of any convenient structural shape and are herein illustrated as box-shaped members.

An elongated tongue 28, which may also be of any convenient structural shape but illustrated as box-shaped, is attached to converging members 16 and 18 and transverse member 26 by any convenient means such as welding. Tongue 28 preferably has a suitable towing hitch 30 mounted adjacent its forward end for connection to a towing vehicle (not shown).

As shown in FIG. 1, the trailer T may be utilized for loading and transporting a boat B. While the trailer will hereinafter be described as utilized in conjunction with a boat, this has been done only by way of illustration and it is contemplated that this invention may be utilized for other uses and that other types of loads may be transported thereon. In the embodiment illustrated, however, side rail 12 conveniently has an end portion 32 offset horizontally therefrom with its extremity attached to transverse member 20 in any convenient manner as by welding. Likewise, side rail 14 has an end portion (not shown) similarly shaped and these end portions combine to form a V-shaped area adjacent the rear of the trailer for guiding the bow of a boat to a position convenient for loading onto the trailer. When utilized for loading and transporting a boat B, the trailer T may conveniently include accessories such as a plurality of rollers 34–36 respectively mounted on transverse members 20, 22 and 26; a pair of side rests 38 and 40 mounted adjacent the rear of the trailer for supporting the stern of a boat during transport; and a pair of inclined arms 42 and 44 adjacent the front of the trailer T for forming a V-shaped cradle to receive the bow of a boat. These accessories are generally well known to those familiar with boat trailers and further description is deemed unnecessary. It is contemplated that when utilized for other purposes, the trailer T could utilize other accessories than those described above.

In a preferred embodiment of the invention, the frame 12 is resiliently supported by a pair of leaf springs sets 50 as best shown in FIG. 1. The set of leaf springs is affixed to a respective side member or side rail 12 or 14. Preferably, the front end of the leaf spring is pivotally mounted directly to the respective side rail as by a mounting 52 (FIG. 3) and the rear end is affixed to the respective side rail by means of a shackle 54. An axle 60 is disposed transverse of the frame and mounted on the spring sets by means of bearings 55, U-shaped bracket 56, and a pair of U-bolts 57 and 58, as best shown in FIGS. 3 and 4. The axle 60 has an offset portion 62 adjacent the end thereof and a wheel mounting portion 64 on the offset portion extending generally parallel to the axle 60. In this manner, the axis of the wheel mounting is substantially eccentric from the axis of the axle 60 at the bearing 55. A pair of wheels 66 and 68 are mounted on the wheel mounting portion 64 and are respectively disposed adjacent side rail members 12 and 14.

As best shown in FIG. 1, when the offset portion 62 extends substantially vertically in a downward direction from the axle 60, the trailer T is in its raised or transport position. In order to maintain the trailer in raised position, a lock means is advantageously provided at one and preferably at both ends of the axle 60 to lock the axle and offset portions 62 in the aforementioned position. As best shown in FIGS. 3–5, each lock means includes a plate 70 mounted on leaf spring 50 by means of U-bolts 57 and 58. An upstanding arm 72 is attached to plate 70 as by welding, and a latch 74 is pivotally mounted on arm 72 by means of fastener 76. A spring 77 (FIG. 4) is conveniently attached to the latch and to arm 72 to urge the latch into the illustrated locked position. A disengaging rod 78 is pivotally connected to the latch for selectively unlocking the same in a manner to be described infra. A stop plate or member 79 is rigidly secured, as by welding to the offset portion 62 of the axle 60 for movement therewith and includes a keeper 80 arranged to engage the latch 74 when the offset portion is in the illustrated raised position. The stop plate 79 is also shaped to provide a stop face 81 which is arranged to engage a laterally extending projection 82 on the plate 70 to provide a stop to restrain the offset portion 62 of the axle from movement in a rearwardly direction. In the above described preferred arrangement, forward movement of the vehicle urges the offset portion of the axle in a rearwardly direction with the stop face 81 engaging the lateral projection 82 on the plate 70. Thus, the stop prevents movement of the offset portion of the axle in a rearwardly direction from the position shown in FIG. 3 and the latch 74 releasably prevents movement of the offset portion a forwardly direction. A forward movement of the disengaging rod 78 will effectuate disengagement of the latch 74 from the keeper 80 and allow rotation of the offset portion in a preferred forwardly direction thus allowing the trailer T to be lowered. In the lowered or loading position, the offset portion 62 extends substantially vertically in an upward direction from axle 60.

As stated above, when the latch 74 is disengaged from the keeper 80, the offset portion 62 of the axle may be moved in a forwardly direction thus effectuating lowering of the trailer T. The actuating means for effectuating this motion will now be described, and while it is described in detail for lowering the trailer, the same actuating means is also advantageously used for raising the trailer. Referring now to FIGS. 7–10, a crank 84 which may be conveniently manually operated, is operable through reducing gears 86–89 to impart motion to sprocket 90 mounted on shaft 92. It is contemplated that other arrangements of gears may be utilized than that shown, or that the actuating means may be power operated. Sprocket 90 operates through chain means 94 to impart motion to a sprocket 96 as best shown in FIG. 7. Chain means 94 may be a continuous chain or other connecting means, but is herein illustrated as a combination chain and cable for economy purposes and for convenient adjustment of tension. It is contemplated that the motion may be transmitted by means other than sprockets and chains with the controlling factor being that there be a positive connection to wheel or sprocket 96. A preferred embodiment of such an alternate arrangement is illustrated in FIG. 7–A. Sprocket or pinion 90 engages a rack 91 which is conveniently disposed within and supported by tongue 28. Rack 91 extends to a point in juxtaposition to pulley or wheel 97. The end of the rack is conveniently flared as at 93, for engagement with a cam 107 on pulley 97. A flexible connecting means, shown in the form of cable 95 is attached at one end to rack 91, as at 99, and at the other end to pulley 97. Thus, when crank 84 is operated, rack 91 will be extended rearwardly, pushing cam 107 overcenter of pulley 97. At this point, wheels 66 and 68 will be moved forward and the weight of the trailer will cause offset portion 62 to move to second or lowered position shown in FIG. 3 in a manner to be described below. Force in the opposite direction, operative through cable 95, will cause pulley 97 to rotate in the opposite direction.

Sprocket 96, or pulley 97, is mounted on transverse shaft 98 which is preferably substantially coaxial with the axis of the front pivotal connection of spring set 50 on mounting 52, as best shown in FIGS. 1 and 2. Whenever sprocket 96 is hereinafter mentioned it should be understood to include pulley 97 on the other wheels and drums. Sprocket 96 is disposed midway between side members 12 and 14 and thus substantially in alignment with tongue 28 and, in this manner, at least a portion of the connecting means may be conveniently carried inside the tongue. To restrain transverse shaft 98 from deflection, a support 99 is mounted on shaft 98 in an area adjacent sprocket 96 and is conveniently secured to transverse member 24. Sprocket 96 is mounted on transverse shaft 98 to rotate therewith and impart motion to sprockets 100 and 101 mounted adjacent respective side members 12 and 14. As best shown in FIG. 3, the sprockets, such as sprocket 101 impart motion to chains, such as chain 102, and thus rotate a corresponding sprocket, such as sprocket 104, mounted on axle 60. While two sets of chains and sprockets are illustrated (FIG. 2), it should be understood that other numbers of sets may be utilized. It is contemplated that other sprocket means and connecting meanes may be utilized to transmit the motion from shaft 98 to axle 60; however, the embodiment illustrated is the preferred form.

As described above, the front end of spring set 50 is pivotally connected to rigid mounting 52 and the only shackle 54 is at the rear end of the spring. Thus, when the spring set deflects or flexes, the axle 60 will move in an arc by pivoting about mounting 52 and thereby maintain generally constant distance from the mounting 52. As also described above, transverse shaft 98 is substantially coaxial with mounting 52. In this advantageous arrangement, deflection of the springs caused by road bumps, etc. will not substantially change the relative distance between axle 60 and mounting 52. Thus, sprockets 101 and 104, mounted on transverse shaft 98 and axle 60 respectively, will remain a substantially constant distance apart and chain 102 will generally receive little shock by flexure of the springs.

A lost-motion pawl 136 is mounted on the trailer tongue 28 by means of fastener 138 for engagement with gear 89. Lost-motion pawl 136 advantageously has an elongated slot 140 in the body to allow gear 89 to back off a limited distance after the trailer T has been raised to its transport position. In this manner, all chains are backed off slightly to remove the tension therein and thus reduce the possibility of breakage through road shocks in transport. As best shown in FIGS. 9 and 10, a spring 142 is attached to lost-motion pawl 136 and tongue 28 to hold said pawl in engagement with gear 89 during the aforedescribed back off and to allow ratcheting of the same while raising the trailer to transport position.

It is now deemed obvious that an operator, by manually turning crank 84 can rotate axle 60 to raise or lower the trailer when the latch 74 is disengaged from keeper 80. A particularly advantageous mechanism for automatically disengaging the latch 74 from keeper 80 at the start of movement of the actuating means is illustrated in FIGS. 3, 4 and 6–8. A cam member 106 is mounted on sprocket 96 to engage a finger 108 mounted on a transverse bar 110. As previously described, lock means is preferably provided at both ends of the axle 60 and the automatic latch disengaging means is arranged to simultaneously release both latches. For this purpose, a transverse bar 110 is rotatably mounted in bearings 112 attached to both side members 12 and 14. Depending arms 114 have their upper ends secured to transverse bar 110 at opposite ends of the latter and pivotally connected to a respective disengaging rod 78 at their lower ends. Thus, at the start of movement of the actuating means by crank 84 to lower the trailer frame, cam member 106 rotates with sprocket 96 in a counterclockwise direction as viewed in FIGS. 1 and 6 and engages finger 108 to pivot the same forward relative to the trailer whereby motion is transmitted through bar 110, arms 114, and disengaging rods 78 to disengage the latch 74 from the respective keepers 80. Because of the reduction ratio through sprockets 96, 100 and 104, this result is obtained without binding of the latch with the keeper since sprocket 96 travels through a considerably greater distance than sprocket 104. In addition, the back-off permitted in all chains by the lost-motion pawl 136 allows the chains 102 to have some slack in the lower run so that, when the initial counterclockwise turning of the sprockets 100, 101 takes up the slack in the lower run of the chains 102. This provides a limited lost-motion in which the sprockets 96 can turn to release the latch before the sprockets 100 and 101 turn to lower the frame.

Referring again to FIGS. 9 and 10, there is illustrated a winch 120 which is mounted adjacent the front of the trailer T and attached to tongue 28 by means of mountings 122 and 122' and shaft 124. Crank 84 is advantageously mounted for slidable movement about axis 85 whereby gear 86 may be disengaged from gear 87 and selectively engaged to gear 126 to operate with the winch 120. The winch may be used to wind a rope 128 for winching a load, such as boat B, onto the trailer, as best shown in FIG. 1. For this purpose, a pulley 130 is conveniently mounted on tongue 28 by means of support 132 in an area adjacent winch 120, as best shown in FIGS. 7 and 7–A. A pawl 134 is engageable with winch gear 126 to hold the same in position as selected by the operator.

While I have thus described a preferred embodiment of my invention, this has been done by way of illustration and not limitation and I do not wish to be limited except as required by the appended claims.

I claim:

1. A trailer comprising a frame, spring suspension means mounted on the frame for resiliently supporting the same, wheel support means mounted on the spring suspension means for turning movement relative thereto about a generally horizontal first pivot axis, wheel means and means mounting the wheel means on the wheel support means for rotation about a second axis eccentric from the first pivot axis, said spring suspension means including a member pivotally connected to said frame for movement about a third axis generally parallel to said first pivot axis, a first sprocket wheel connected to said wheel support means for rotation therewith about said first pivot axis, a second sprocket wheel rotatably supported on said frame substantially concentric with said third axis, connecting means operatively connecting said first and second sprocket wheels whereby the wheel support means is rotated when the second sprocket wheel is rotated, and operating means for rotating said second sprocket wheel and thereby raising and lowering the trailer.

2. A trailer comprising a frame, spring suspension means mounted on the frame for resiliently supporting the same, wheel support means mounted on the spring suspension means for turning movement relative thereto about a generally horizontal first pivot axis, wheel means and means mounting the wheel means on the wheel support means for rotation about a second axis eccentric from the first pivot axis, said spring suspension means including a member pivotally connected to said frame for movement about a third axis generally parallel to said first pivot axis, a first sprocket wheel connected to said wheel support means for rotation therewith about said first pivot axis, a second sprocket wheel rotatably supported on said frame substantially concentric with said third axis, connecting means operatively connecting said first and second sprocket wheels whereby the wheel support means is rotated when the second sprocket wheel is rotated, operating means selectively operable for rotating said second sprocket wheel in one direction to lower the frame and in a second direction to raise the frame, lock means for locking said wheel support means in a preselected position whereby the trailer is held in the raised position, lock release means connected to said operating means for moving said lock means to a release position in response to movement of the operating means to rotate the second sprocket wheel in said one direction.

3. A trailer comprising a frame, spring suspension means mounted on the frame for resiliently supporting the same, wheel support means mounted on the spring suspension means for turning movement relative thereto about a generally horizontal first pivot axis, wheel means and means mounting the wheel means on the wheel support means for rotation about a second axis eccentric from the first pivot axis, said spring suspension means including a member pivotally connected to said frame for movement about a third axis generally parallel to said first pivot axis, a first sprocket wheel connected to said wheel support means for rotation therewith about said first pivot axis, a second sprocket wheel rotatably supported on said frame substantially concentric with said third axis, connecting means operatively connecting said first and second sprocket wheels whereby the wheel support means is rotated when the second sprocket wheel is rotated, operating means selectively operable for rotating said second sprocket wheel and thereby raising and lowering the frame, winch means adjacent the front of the frame for winching a load onto the trailer, said operating means including a crank means adjacent the front of the frame for turning said operating means in one position, and means mounting said crank means for movement between said one position and a second position for turning said winch means.

4. A trailer comprising a generally elongated frame having front and rear ends, a pair of spring suspension means each attached to said frame adjacent opposite sides thereof and depending therefrom for resiliently supporting the frame and each including a support member having one end pivotally connected to the frame, wheel support means and means mounting the wheel support means on said support member for turning movement about a generally horizontal pivot axis, a pair of wheels located at the sides of the frame, offset means for mounting the wheels on the wheel support means for rotation about an axis eccentric from said horizontal pivot axis, said offset means so constructed and arranged that the frame is in a lowered position when the offset means in one position extends in a substantially vertical upwardly direction and movable from said one position to a second position whereby the frame is in a raised position, and actuating means for rotating said wheel support means thereby moving said offset means between said one position and said second position and including a shaft mounted for rotation and extending crosswise of said frame generally concentric with the pivotal connection of said support member, first rotating means on said shaft and rotatable therewith, second rotation means on said wheel support means and rotatable therewith, means operatively connecting said first and second rotating means whereby the wheel support means will be rotated when the shaft is rotated, and operating means adjacent the front of the trailer for rotating said shaft and thereby raising and lowering the trailer.

5. A trailer comprising a generally elongated frame having front and rear ends including a pair of side members spaced apart at the rear end of the frame, a pair of leaf spring sets each attached to one of said side members and depending therefrom for resiliently supporting the frame, each said set of leaf springs having its front end pivotally connected to the respective side member and its back end pivotally connected to a shackle which is attached to the respective side member, wheel support means and means mounting the wheel support means on the spring sets for turning movement about a generally horizontal pivot axis, wheel means and means mounting the wheel means on the wheel support means for rotation about an axis eccentric to said horizontal axis, first sprocket wheel means mounted on the wheel support means for rotation therewith between a lowered position for the frame and a raised position for the frame, lock means for locking said frame in raised position, and actuating means operable for turning said axle means thereby moving the frame between said raised and lowered positions, said actuating means including second sprocket wheel means adjacent the front of the trailer and means for rotating the same, a shaft transverse of said frame and mounted adjacent the front of said leaf springs, third sprocket wheel means mounted on a shaft and rotatable therewith and operatively connected to said second sprocket wheel means for rotation when said second sprocket wheel means is rotated, fourth sprocket wheel means mounted on the shaft and rotatable therewith and operatively connected to the first sprocket wheel means for transmitting rotation to the wheel support means whereby movement of the second sprocket wheel means operates to move the frame between said raised and lowered positions.

6. A trailer comprising a generally elongated frame having front and rear ends and including a pair of side members spaced apart at the rear end of the frame, a pair of leaf spring sets each attached to one of said side members and depending therefrom for resiliently supporting the frame, each said set of leaf springs having its front end pivotally connected to the respective side member and its back end pivotally connected to a shackle which is attached to the respective side member, bearings attached to each said set of leaf springs, wheel support means rotatable in said bearings for supporting a wheel adjacent each respective side of the frame, a wheel rotatably mounted adjacent each end of the wheel support means, said wheel support means having an offset portion whereby the axis of the wheel is substantially eccentric from the bearing, a pair of first sprocket wheels each mounted on the axle means adjacent each bearing for rotating said wheel support means between a lowered position for the frame whereby the offset portion in one position extends in a substantially vertical upwardly direction and a raised position for the frame whereby the offset portion is moved from said one position to a preselected angular position therefrom, lock means for locking said offset portion in said raised position, and actuating means operable for moving said offset portion between said one position and said raised position, said actuating means including a second sprocket wheel adjacent the front of the trailer and means for rotating the same, a shaft disposed substantially transverse of said frame and mounted adjacent the front of said leaf springs, a pair of shaft sprocket wheels on the shaft and chain means from each said shaft to the corresponding first sprocket wheel on the axle, a third shaft sprocket wheel on the shaft intermediate said pair of shaft sprocket wheels and second chain means from said third shaft sprocket wheel to the second sprocket wheel adjacent the front of the trailer whereby movement of said second sprocket wheel operates to rotate the wheel support means and move the offset portion between said one position and said raised position.

7. A trailer of the lowering frame type including a frame, wheel support means and means mounting the wheel support means on the frame for turning movement about a generally horizontal pivot axis, a pair of wheels located at the sides of the frame, offset means for mounting the wheels on the wheel support means for rotation about an axis eccentric from said horizontal pivot axis and so constructed and arranged that the frame is in a lowered position when the offset means in one position extends in a substantially vertical upwardly direction, said offset movable from said one position to a second position whereby the frame is in a raised position, actuating means for turning said offset means between said first and second positions, mechanical lock means for holding the offset means in said second position and thereby holding the frame in raised position, lock release means connected to said mechanical lock means for disengaging the mechanical lock means whereby the offset means may be moved from said second position to said one position, and means attached to the lock release means and engageable with the actuating means for operating the lock release means to disengage the mechanical lock means at the start of operation of said actuating means.

8. In a trailer of the lowering frame type including a frame, wheel support means and means mounting the wheel support means on the frame for turning movement about a generally horizontal pivot axis, a pair of wheels located at the sides of the frame, offset means for mounting the wheels on the wheel support means for rotation about an axis eccentric from said horizontal pivot axis, said offset means so constructed and arranged that the frame is in a lowered position when the offset means in one position extends in a substantially vertical upwardly direction and movable from said one position to a second position whereby the frame is in a raised position, the improvement comprising: stop means for engaging the wheel support means for limiting movement of said offset means at said second position and so constructed and arranged that the offset means extends in a substantially vertical downwardly direction at said second position whereby forward movement of the trailer urges the wheel support means against the stop means, lock means for preventing movement of said offset means in a forwardly direction from said second position, lock release means connected to said lock means for disengaging the lock means whereby the offset means may be moved from said second position, and actuating means for moving said offset portion between said first and second positions through an arc toward the front of the frame.

9. A trailer of the lowering frame type including a frame, wheel support means and means mounting the wheel support means on the frame for turning movement about a generally horizontal pivot axis, a pair of wheels located at the sides of the frame, offset means for mounting the wheels on the wheel support means for rotation about an axis eccentric from said horizontal pivot axis, said offset means so constructed and arranged that the frame is in a lowered position when the offset means in one position extends in a substantially vertical upwardly direction and movable from said one position to a second position whereby the frame is in a raised position, actuating means for moving said offset portion between said first and second positions, winch means attached adjacent the front of the frame for winching a load onto the trailer, and crank means attached adjacent the front of the frame for rotation about a crank axis for movably operating said actuating means in one position and selectively slidable along said crank axis to a second position for engaging said winch means for movably operating the same.

10. A trailer comprising: a frame, a pair of wheels located at the sides of the frame, axle means connected to each wheel adjacent the end of said axle means for supporting said wheels for rotation, connecting means operably connecting said axle means to the frame and so constructed and arranged that the axle means may be rotated, said axle means having an offset portion between the wheel and the connecting means whereby the axis of the wheel is substantially eccentric from the axis of the axle means at the connecting means, said axle means so constructed and arranged that the frame is in a raised position when the offset portion in transport position extends in a substantially vertical downwardly direction, stop means for preventing movement of said offset portion in a rearwardly direction from said transport position whereby movement of the trailer in a forward direction urges the offset portion against the stop means, lock means for preventing movement of said offset portion in a forwardly direction from said transport position, lock release means connected to said lock means for disengaging the lock means whereby the offset portion may be moved from said transport position, actuating means for actuating said offset portion to move about said axle axis at the connecting means forward of said stop means and upwardly to a load position extending substantially upwardly, means connected to the actuating means and the lock release means for operating the lock release means to disengage the lock means at the start of said actuating, winch means attached adjacent the front of the frame for winching a load onto the trailer, said actuating means including crank means for manually operating said actuating means, said crank means attached adjacent the front of the frame for selectively operating said actuating means and said winch means.

11. A trailer comprising: a frame, spring suspension means attached to said frame and depending therefrom for resiliently supporting said frame, bearings attached to said spring suspension means, axle means rotatable in said bearings and disposed substantially transverse of said frame for supporting a wheel adjacent each respective side of said frame, a wheel rotatably mounted adjacent each end of the axle means, said axle means having an offset portion between said bearing and said wheel whereby the axis of the wheel is substantially eccentric from the bearing, said axle means so constructed and arranged that the frame is in a raised position when said offset portion extends substantially vertically in a downward direction from said bearing in transport position, lock means on the axle means for locking said offset portion in said transport position thereby locking said frame in said raised position, lock release means connected to said lock means for disengaging the lock means whereby said offset means may be moved from said transport position, actuating means for turning said offset means to a load position extending substantially vertically in an upward direction for lowering said frame, said actuating means moving the offset means between said transport and load positions through an arc toward the front of the frame, and means attached to the lock release means and engageable with the actuating means for operating the lock release means to disengage the lock means at the start of said actuating.

12. The apparatus of claim 11 including winch means attached adjacent the front of the frame for winching a load onto the trailer, said actuating means including crank means for manually operating said actuating means, and means slidably mounting said crank means adjacent the front of the frame for selectively operating one of the group comprising said actuating means and said winch means.

13. A trailer comprising a frame, spring suspension means attached to said frame and depending therefrom for resiliently supporting said frame, axle means disposed substantially transverse of said frame for supporting a wheel adjacent the respective sides of said frame, means for attaching said axle means to said spring means, a wheel rotatably mounted adjacent each end of the axle means, said axle means having a crank-like offset portion between said wheel and said attaching means whereby the frame is in a lowered position when said offset portion in one position extends in a substantially vertical upwardly direction, actuating means for actuating said offset portion to a second position for raising the frame to a transport position, said actuating means including sprocket means adjacent the front of the frame, a pawl engageable with said sprocket means to prevent rotation of said sprocket means in the direction to lower the frame, lock means for locking said offset portion in said second position, said lock means including a keeper on the offset portion and a latch on the spring means engageable with the keeper, lock release means for disengaging the latch from the keeper, and a cam on the actuating means for engaging the lock release means at the start of said actuating and thereby disengaging said latch.

14. A trailer comprising: a generally elongated frame having front and rear ends and including a pair of side members spaced apart at the rear end of the frame, leaf spring affixed to and depending from each side member for resiliently supporting the frame, bearings attached to said springs intermediate the ends thereof, an axle crosswise of the frame and rotatably secured to said bearings, said axle having an offset portion at each end extending beyond said bearings, wheels rotatably mounted on each said offset portion, said frame being disposed in a raised position when said offset portions are substantially vertical in a downwardly direction in transport position, a stop mounted on each spring in an area rearwardly of the bearing and extending laterally therefrom, a pair of locks including a keeper mounted on each offset portion and a latch mounted on each stop and engageable with the keeper for locking the offset portions against forward movement from said transport position, said keepers and stops so constructed and arranged that the keeper engages the stop when the offset portion is in said transport position whereby pulling the trailer in a forward direction urges each keeper against the respective stop, release means for moving the latch from engagement with the keeper whereby the offset portion may be moved from said transport position in a forward arc to a load position in a substantially vertical upwardly extending direction whereby the frame is in a lowered position, actuating means for moving the offset portion between said transport position and said load position and comprising a crank rotatably mounted on the frame adjacent the front end thereof, front sprocket means attached to said handle and rotatably therewith, first connecting means engaged with said front sprocket means and to an intermediate sprocket means mounted on a shaft transverse of the frame and intermediate the crank and the axle for rotating said intermediate sprocket means and shaft, a pair of second shaft sprocket means mounted on said shaft and rotatable therewith, a corresponding pair of axle sprocket means mounted on the axle, a pair of connecting means engaged with said second shaft sprocket means and the axle sprocket means, said actuating means transmitting motion of the crank to the axle thereby moving the offset portion between said transport position and said load position, a pawl engageable with said front sprocket means for restraining the actuating means from said moving, a pair of rods each attached at one end to a respective latch for pulling the latch to disengage same from the keeper whereby the offset portion may be moved from the transport position to said load position, a bar transverse of the frame in an area adjacent to the shaft, an arm on each end of the bar and connected to the other end of the respective rod, a finger on the bar in an area adjacent said intermediate sprocket, a cam on the intermediate sprocket for engaging the finger, said cam and finger so constructed and arranged that the cam engages the finger at the start of said actuation thereby rotating the bar and disengaging the latches.

15. The apparatus of claim 14 wherein said pawl has the elongate slotted body and arranged to ratchet when the offset portion is being moved from said load position to said transport position, said slotted body arranged to provide lost motion for said sprocket means after said transport position has been reached thereby slackening the tension in said first chain means and said pair of chains.

16. The apparatus of claim 14 including winch means mounted adjacent the front of the frame for winching a load onto the trailer, and means slidably mounting said crank for selective engagement with said front gear means and said winch means.

17. The combination of claim 10 wherein: the stop means is mounted rearward of the wheel support means and arranged for engaging said offset means at said second position; wherein the lock means includes a latch mounted on the stop means and a keeper mounted on the offset means for engaging the latch at said second position.

References Cited by the Examiner

UNITED STATES PATENTS

| | | | |
|---|---|---|---|
| 2,681,811 | 6/1954 | Green | 280—43.11 |
| 2,806,710 | 9/1957 | Mascaro | 280—43.23 X |
| 2,987,203 | 6/1961 | Funk | 214—506 |
| 3,130,980 | 4/1964 | Monroe et al. | 280—43.23 |

GERALD M. FORLENZA, *Primary Examiner.*

ALBERT J. MAKAY, *Examiner.*

UNITED STATES PATENT OFFICE
CERTIFICATE OF CORRECTION

Patent No. 3,318,472

May 9, 1967

Hadley T. Clark

It is hereby certified that error appears in the above numbered patent requiring correction and that the said Letters Patent should read as corrected below.

Column 10, line 18, for "spring" read -- springs --; line 46, for "rotatably" read -- rotatable --; column 11, line 3, for "chain" read -- connecting --; same line 3, for "chains" read -- connecting means --; line 9, for the claim reference numeral "10" read -- 8 --.

Signed and sealed this 28th day of November 1967.

(SEAL)
Attest:

Edward M. Fletcher, Jr.
Attesting Officer

EDWARD J. BRENNER
Commissioner of Patents